March 4, 1969  B. J. FRAZIER  3,430,919
HYDRAULICALLY BALANCED PLUG VALVE
Filed March 3, 1967  Sheet 1 of 2
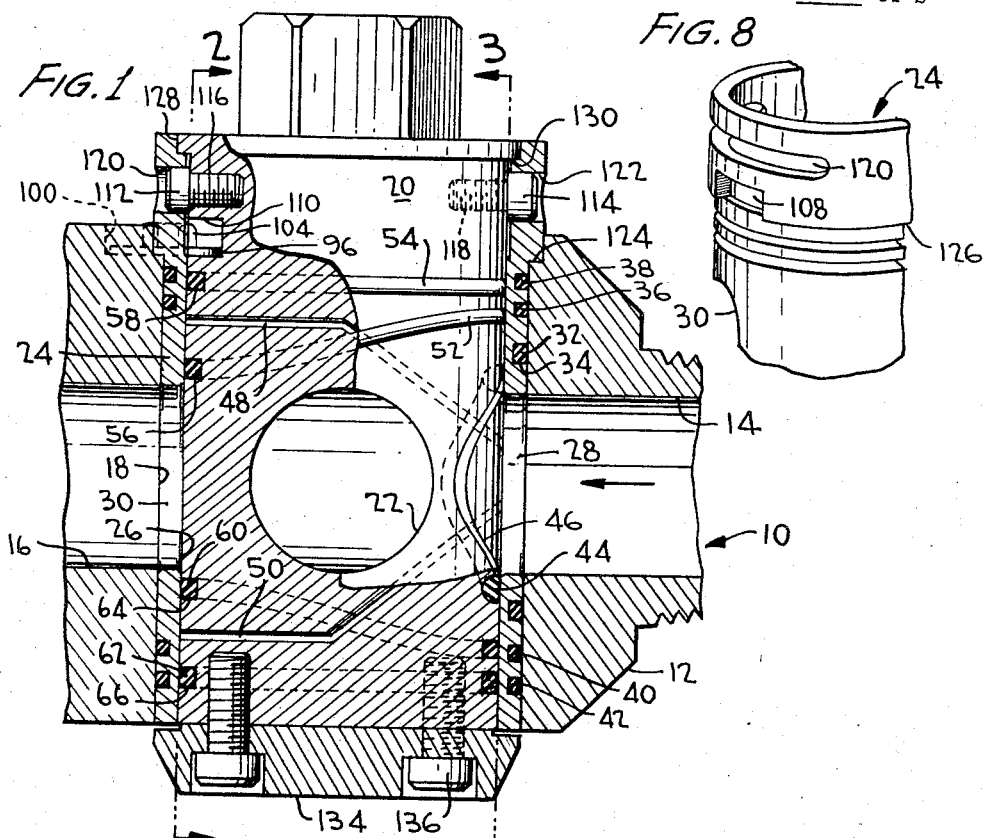
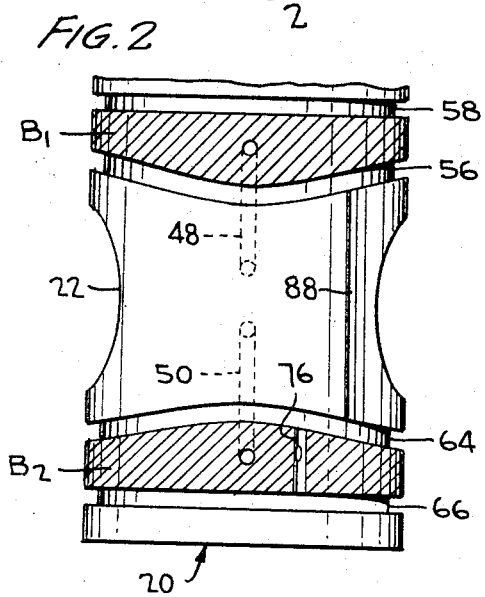
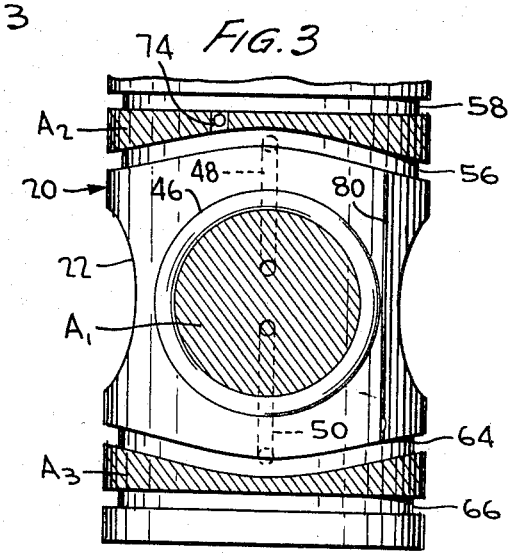
INVENTOR,
BRUCE J. FRAZIER
BY Burns, Doane, Benedict, Swecker & Mathis
ATTORNEYS

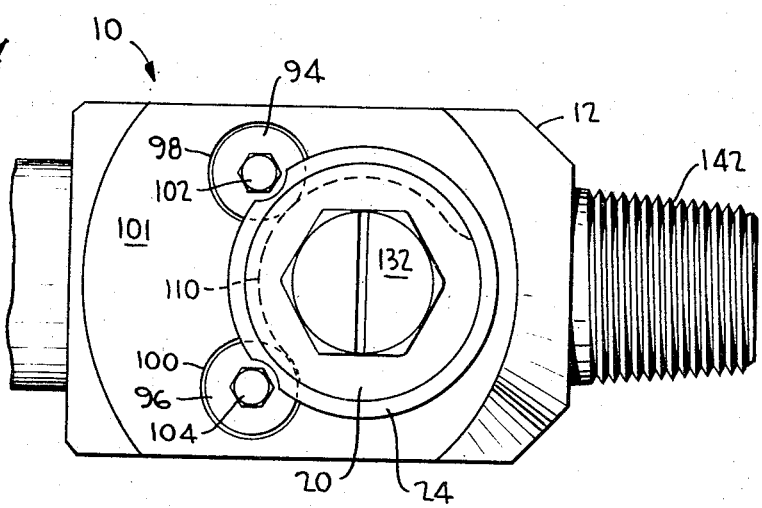
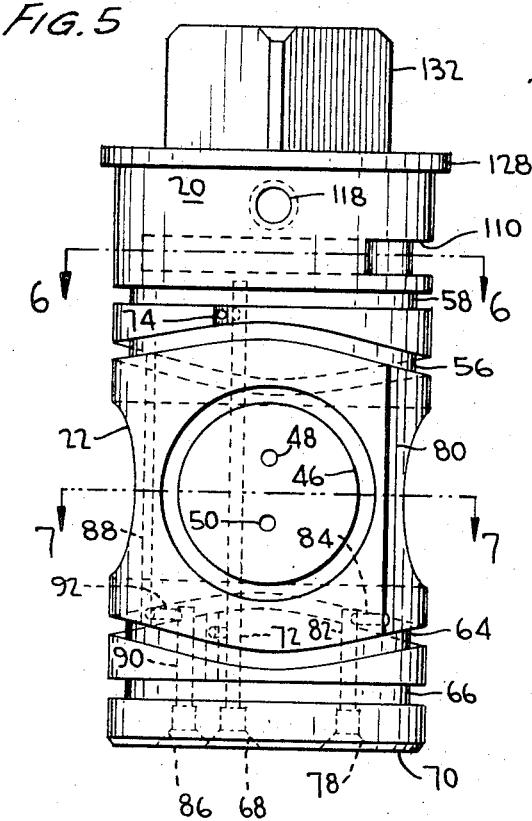
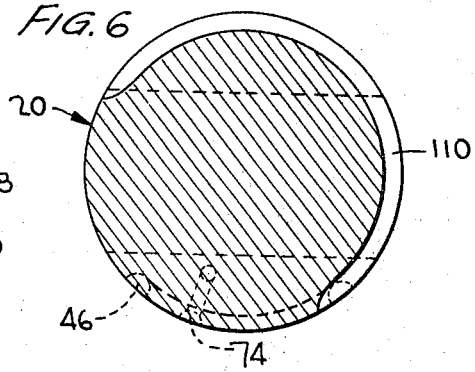
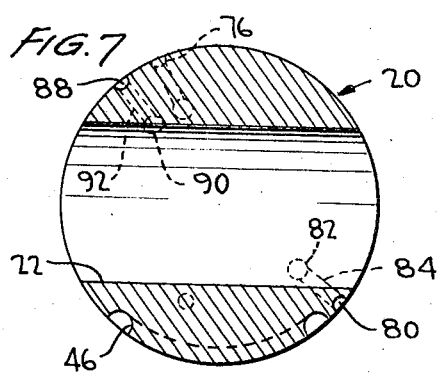

United States Patent Office 3,430,919
Patented Mar. 4, 1969

3,430,919
HYDRAULICALLY BALANCED PLUG VALVE
Bruce J. Frazier, Duncan, Okla., assignor to Halliburton Company, Duncan, Okla., a corporation of Delaware
Filed Mar. 3, 1967, Ser. No. 620,467
U.S. Cl. 251—283                                6 Claims
Int. Cl. F16k 5/04, 39/06

ABSTRACT OF THE DISCLOSURE

A rotary plug valve comprised of a valve body, a cylindrical plug rotatably mounted therein and a non-rotatably mounted liner interposed between the plug and the body. The plug is hydraulically balanced to reduce the torque required to operate the valve. Fluid is conducted from the upstream side of the plug in the closed position to upper and lower sealed balancing chambers in contact with the surface of the plug. Each of the balancing chambers encloses a continuous balancing area on the plug surface which extends about the entire circumference of the plug. Each of the balancing areas varies from a minimum on the upstream side to a maximum on the downstream side, when the plug is in the closed position.

Background of the invention

This invention relates to valves and more particularly to rotary, hydraulically balanced plug valves.

Plug valves have been found to be very effective for controlling the flow of abrasive cement slurries, fracturing fluids, and acid solutions under line conditions wherein very high working pressures are encountered.

One of the problems associated with such valves under these conditions is the high torque required to operate them. This is due to the high frictional forces which are generated between the downstream side of the plug and the mating surface of the valve body when the valve is in the closed position. Since these valves are generally provided with an upstream seal for the plug which circumscribes the valve inlet passage so as to minimize leakage of fluid into the body of the valve, these forces may be increased.

In an effort to reduce the high torque required to operate these valves, various means are utilized to lower the frictional forces between the plug and the valve body. Some valves employ liners or inserts between the valve body and the plug made of a plastic having a low coefficient of friction. Others employ inserts and plugs which are fabricated from dissimilar metals. Also, in some valves, lubrication is provided between the sliding surfaces of the valve elements. Despite these efforts, the operational torque requirements of the plug valves available heretofore remain excessive and undesirable, sometimes being as high as several thousand inch pounds for a two inch valve subjected to a line pressure of about 15,000 p.s.i.

Accordingly, it is a primary object of the present invention to provide an improved rotary plug valve for use in high pressure line service wherein fluid leakage is minimized and wherein the operational torque requirements are very low.

Another object of this invention is the provision of a rotary plug valve for use in applications where very high fluid pressures are encountered wherein the plug is hydraulically balanced at various rotational positions, including the closed position, to reduce the torque required to operate the valve.

Summary of the invention

In accordance with a preferred embodiment of the present invention, the above and other objects are attained by the provision of a rotary plug valve having an upstream or inlet seal wherein the line pressure on the upstream sealed area of the plug in the closed position is directed to upper and lower circumferential fluid balancing chambers which define balancing areas or zones on the surface of the plug. The balancing areas are disposed on either side of the valve flow passage and each is enclosed by a pair of axially spaced-apart O-rings arranged about the circumference of the plug. The space between the rings of each pair varies from a minimum on the upstream side of the plug to a maximum on the downstream side of the plug.

The two pairs of O-rings are positioned such that the total balancing area on the downstream side of the plug minus the total balancing area on the upstream side thereof equals the area within the upstream seal. Thus, when the valve is in the closed position, the force of the high pressure fluid acting on the upstream sealed area of the plug is balanced by a resultant opposing force acting on the balancing areas, whereby the plug is caused to float centrally within the valve body.

Means may be provided for conducting a lubricant to the surface of the plug within each of the balancing areas so as to further reduce the frictional forces on the plug. The lubricant therein may become pressurized and act as a fluid bearing about the balancing areas when the areas are exposed to the line pressure.

The valve may be provided with a removable insert or liner mounted between the valve body and the plug by fastening means to prevent both rotational movement and axial movement thereof with respect to the valve body; which fastening means may cooperate with the plug so as to prevent axial movement thereof while allowing it to rotate between open and closed positions.

Brief description of the drawings

FIGURE 1 is an elevational view, partly in section, of a hydraulically balanced rotary plug valve constructed in accordance with the teachings of the present invention;

FIGURE 2 is an elevational view of part of the valve plug showing the upper and lower balancing areas on the downstream side of the plug when in the closed position;

FIGURE 3 is an elevational view of part of the valve plug showing the upper and lower balancing areas on the upstream side of the plug when in the closed position;

FIGURE 4 is a top plan view of the rotary plug valve of FIGURE 1;

FIGURE 5 is an elevational view of the entire valve plug showing the upstream side thereof when the plug is in the closed position;

FIGURE 6 is a sectional view of the plug taken along the lines 6—6 of FIGURE 5;

FIGURE 7 is a sectional view of the plug of FIGURE 5 taken along the lines 7—7; and FIGURE 8 is a perspective view of part of the valve liner utilized with the valve of FIGURE 1.

Description of the preferred embodiment

Turning now to the drawings in more detail, there is shown in FIGURE 1 a rotary plug valve generally indicated by the numeral 10 which comprises a valve body 12 having an inlet passage 14, an outlet passage 16, and a bore or seat 18 extended transversely of the inlet and outlet passages. A generally cylindrical valve plug 20, illustrated in the closed position, is rotatably disposed within the bore 18 of the valve body and is provided with a passageway 22 extending through the plug and adapted to be placed into registry with the inlet passage 14 and the outlet passage 16 upon rotation thereof.

Since the plug valve 10 is intended primarily for high pressure line service and because of the types of fluids which may be controlled by this valve, a cylindrical insert or liner 24 is mounted within the valve body bore 18 for non-rotative movement therein. The insert 24 has an internal bore 26 which is in intimate sliding contact with the cylindrical surface of the plug 20 and includes an inlet passage 28 and an outlet passage 30 which match the inlet and outlet passages 14 and 16 of the valve body 10, respectively. As with other valves of this general type, the insert 24 may be provided with an upstream seal in the form of an O-ring 32 circumscribing the inlet passage 14 and received within a circular groove 34 formed concentrically of the inlet passages of the insert and valve body. The upstream seal 32 is designed to prevent the intrusion of fluids into the bore 18 of the valve body 10. Additional sealing means may also be provided for the insert 24 by the provision of an upper and a lower pair of circumferentially arranged O-rings 36, 38 and 40, 42, respectively, situated in suitable grooves.

An upstream or inlet seal is provided for the valve plug 20 by means of a resilient seal member 44 in the form of an O-ring positioned in a circular groove 46 which circumscribes the insert inlet passage 28. The O-ring seal 44 defines an upstream seal area $A_1$ on the plug surface, shown in FIGURE 3, when the valve is in the closed position.

In the closed position, the high pressure fluid in the line produces a mechanical force on the upstream sealed area $A_1$ of the plug 20 which causes the plug 20 to move or float in a downstream direction into firm contact with the downstream side of the insert bore 26. Thus the torque necessary to rotate the plug 20 from the closed to the open position will be determined by the frictional forces developed between it and the insert 24 and by the diameter of the plug 20. These forces can be quite high. For example, in one installation requiring a valve having an inlet passage diameter of approximately 2.68 inches and a plug having a diameter of about 4.675 inches, a line pressure of about 15,000 p.s.i. will act on the upstream seal area $A_1$ to produce a transverse force on the plug in the neighborhood of about 85,000 lbs. Under such a force, the torque required to rotate the plug may be as high as about 10,000 inch lbs. even assuming the presence of a thin film of lubricant between the surfaces of the plug and the valve body or insert.

The present invention provides a hydraulic balancing means to significantly lower the torque which might ordinarily be required to rotate the plug 20, under conditions such as described above. This is accomplished by directing the line pressure acting on the upstream seal area $A_1$ of the plug 20 to an upper and a lower balancing area defined on the downstream side surface of the plug 20 conveniently identified as $B_1$ and $B_2$, respectively, in FIGURE 2. A pair of divergent channels 48 and 50, respectively, may be formed through the plug 20 so as to expose the balancing areas $B_1$ and $B_2$ to the line pressure acting on the upstream seal area $A_1$.

The upper balancing area is situated above the plug passageway 22 and may be enclosed by a pair of resilient O-rings 52 and 54 positioned in a pair of corresponding circular grooves 56 and 58 formed in the cylindrical surface of plug 20. The lower balancing area is situated below the passageway 22 and may be similarly enclosed by a pair of O-rings 60 and 62 positioned in a pair of corresponding circular grooves 64 and 66. As shown in FIGURE 3, the upper and lower balancing areas on the upstream side surface of the plug 20 may be identified as $A_2$ and $A_3$, respectively.

O-rings 54 and 62 lie in planes which are substantially perpendicular to the longitudinal axis of the plug 20 and O-rings 52 and 60 lie in planes which are inclined thereto. The O-rings of each pair are thus variably spaced apart on the plug 20 with the axial separation distance between the O-rings of each pair being a minimum on the upstream side and a maximum on the downstream side of the plug 20.

More precisely, in order to insure a complete balance of the plug 20, i.e., to equalize the forces on the plug 20 in all directions when the valve is in the closed position, the upper and lower pairs of O-rings 52, 54 and 60, 62 are arranged such that the total balancing area on the downstream side surface of the plug $(B_1+B_2)$, minus the total balancing area on the upstream side surface of the plug $(A_2+A_3)$, equals the upstream seal area $A_1$. This relationship may be expressed as follows:

$$(B_1+B_2)-(A_2+A_3)=A_1$$

By this arrangement, when the valve 10 is controlling the flow of high pressure fluid in a line (not shown), and is closed, the plug 20 will float centrally within the insert 24. The torque thus required to open the valve 10 will be reduced essentially to the force required to overcome the friction between the several O-rings 44, 52, 54, 60, 62 and the inner surface of the insert 24.

Since there is very little movement of fluid within the upper and lower balancing areas, a lubricant may be introduced into these areas to maintain the respective pairs of O-rings in a lubricated condtion to further reduce the friction forces. Also, a pair of annular fluid bearings comprised of the lubricant may be produced between the plug 20 and the insert 24 when the balancing areas are pressurized by the high pressure line fluid.

As shown in FIGURE 5, the lubricant may be introduced into these areas by means of an opening 68 formed in the lower end face 70 of the plug 20, a longitudinally extending internal channel 72, and a pair of upper and lower passages 74 and 76 terminating within the respective balancing areas.

Passages may also be provided for lubricating the large surface area of the plug 20 intermediate the balancing areas, or between the O-ring 52, and the O-ring 60. On the upstream side of the plug 20, lubricant may be introduced through an opening 78 in the lower face 70 to be conducted to a longitudinally extending groove 80 in the plug surface by means of internal passages 82 and 84. Similarly, to lubricate the downstream side of the plug 20, an opening 86 may be provided to conduct lubricant to a longitudinally extending surface groove 88 by way of internal passages 90 and 92.

The insert 24 may be secured within the valve body 12 against rotation and against axial movement by means of a pair of positioning washers 94 and 96 held in a pair of circular recesses 98 and 100 formed in the top surface 101 of the valve body 12 by a pair of cap screws or the like 102 and 104. The washers 94 and 96 extend radially inwardly of the insert 24 through a pair of complementary slots 106 and 108 as in FIGURE 8. The washers 94 and 96 also may extend into a groove 110 formed about a portion of the periphery of the plug 20 to cooperate with the plug 20 and restrain axial movement thereof.

In plug valves of this general type it is preferable that the amount of rotational movement of the plug 20 be limited to approximately 90° during operation of the valve 10. To this end, a pair of limit pins or screws 112 and 114 may be threadably received in bores 116 and 118, respectively, on opposite sides of the plug 20 adjacent the upper end thereof. The pins 112 and 114 may slidably engage a pair of slots 120 and 122 formed through the insert 24 adjacent its upper end, each of which comprises an arc of approximately 90°.

An annular seat 124 may be formed in the upper end of the valve body 12 radially outwardly of the valve body bore 18 to receive a shoulder 126 of the insert 24. The desired axial location of the insert 24 can thus be maintained through the combined effect of this structure with the positioning washers 94 and 96 and their complementary slots 106 and 108.

The upper end or top portion of the plug 20 may be provided with a radially outwardly extending shoulder portion or flange 128, and the upper end of the insert 24 may be counterbored at 130 to provide a suitable seat therefor. A hexagonal head 132 may be provided on the end of the valve plug 20 to facilitate rotation thereof with the assistance of a suitable tool (not shown).

The lower end of the plug 20 may be provided with an end cap 134 secured to the plug 20 by means of suitable threaded fasteners 136. Tapered threads 140 may be formed on a lateral extension 142 of the valve body 12 in order to join the valve 10 to a pipe or other conduit.

While many different materials may be used for the valve body 12, the plug 20 and the insert 24, it has been found that high strength alloy steels are preferred to insure long life and minimum corrosion of the parts. The several O-rings may be made from a variety of elastomeric materials depending on the particular fluids being handled by the valve 10, but for most situations, Teflon has been found to be satisfactory.

While the valve 10 has been shown and described as utilizing a removable insert 24 between the plug 20 and the bore 18 of the valve body 12, the hydraulic balancing concept of the present invention may be utilized in a rotary plug valve without an insert or liner with similar advantageous results.

By the provision of the circumferentially disposed O-rings to enclose the balancing areas on the plug surface, wearing of the O-rings will be minimized during plug rotation and thus the life of the fluid seals afforded thereby will be extended. Furthermore, by arranging the pairs of O-rings on the plug in this fashion, mechanical assembly of the valve may be simplified since the O-rings may be seated in their respective grooves in a slightly expanded condition.

The concept of continuous circumferential balancing chambers which completely surround the plug provides a substantial hydraulic balancing effect on the plug in positions other than fully closed. While each of the chambers in the embodiment disclosed comprises a pair of O-rings seated in plug grooves and the opposed surface areas of the insert bore and the plug sealed off between the rings, other constructions may be employed to advantage as long as the fluid confined within each chamber engages circumferential portions of the plug surface.

What is claimed is:

1. A rotary plug valve adapted for use in a high pressure fluid line comprising:
   a valve body,
   a body passage extending through said valve body, said body passage adapted to be placed in fluid communication with the high pressure fluid line,
   a valve seat in said valve body extending transversely of said body passage,
   a cylindrical plug rotatably mounted within said valve seat, said plug having a plug passage extending through said plug,
   said plug being selectively rotatable between an open position in which said plug passage registers with said body passage and a closed position out of registry with said body passage, said plug in said closed position being directly exposed to upstream fluid pressure within said body passage over a first peripheral area of said plug,
   seal means connected with said plug in sealing contact with said valve seat, said seal means providing fluid tight enclosed spaces between said plug and said valve seat extending about
       a second peripheral area of said plug on an upstream side thereof, and
       a third peripheral area of said plug on a downstream side thereof, said third peripheral area exceeding said second peripheral area by an area generally equal to said first peripheral area,
   said seal means further providing for fluid communication between the enclosed spaces extending about said second and third peripheral areas of said plug, and
   fluid passage means within said body extending from at least one of said enclosed spaces to intersect said first peripheral area.

2. A rotary plug valve as defined in claim 1 wherein said seal means includes:
   a first seal assembly including
       a first, annular seal member extending completely around the periphery of said plug in sealing contact between said plug and said valve seat.
       a second annular seal member spaced axially from said first annular seal member extending completely about the periphery of said plug in sealing contact between said plug and said valve seat, said first and second seal members being axially spaced apart by a relatively greater amount downstream of said plug than said annular members are spaced apart upstream of said plug to cause the downstream peripheral area of said plug embraced between said annular members to be greater than the upstream peripheral area of said plug embraced between said annular seal members.

3. A rotary plug valve as defined in claim 2 further including:
   a second seal assembly similar to said first seal assembly, said first and second seal assemblies being spaced axially of said plug on opposite sides of said plug passage, said first and second seal assemblies together enclosing an aggregate upstream peripheral area of said plug defining said second peripheral area thereof, said first and second seal assemblies together enclosing an aggregate downstream peripheral area of said plug defining said third peripheral area thereof.

4. The rotary plug valve as set forth in claim 3, wherein:
   said first and second seal assemblies each includes a pair of axially spaced apart annular grooves formed about the peripheral surface of said plug, said annular seal members positioned in said grooves in fluid sealing relation with said plug.

5. The rotary plug valve as set forth in claim 3, further comprising:
   an annular resilient inlet sealing member positioned in a circular groove formed on the surface of said plug, said groove and said sealing member being concentrically disposed about the periphery of said body passage when said plug is in the closed position.
   said annular inlet sealing member defining said first peripheral area on the surface of said plug, and
   said fluid passage means comprising a first passage formed in said plug extending from a first opening within said first peripheral area to an opening within the peripheral area of said plug enclosed by said first seal assembly, and a second passage formed in said plug extending from a second opening within said first peripheral area to an opening within the peripheral area of said plug embraced by said second seal assembly.

6. The rotary plug valve as set forth in claim 3, further comprising:
   passage means in said plug for conducting a lubricant to the peripheral area of said plug enclosed within said first and second seal assemblies.

References Cited

UNITED STATES PATENTS

| | | | |
|---|---|---|---|
| Re. 25,920 | 11/1965 | Moen | 251—281 X |
| 2,229,933 | 1/1941 | Parker | 251—283 X |
| 2,868,221 | 1/1959 | Eichenberg et al. | 251—283 X |

FOREIGN PATENTS 534,610  3/1941  Great Britain.

WALTER A. SCHEEL, *Primary Examiner.*

LEON G. MACHLIN, *Assistant Examiner.*

U.S. Cl. X.R.

251—312